United States Patent
Ni

(10) Patent No.: US 8,355,425 B2
(45) Date of Patent: Jan. 15, 2013

(54) UWB RECEIVER AND A DATA TRANSMISSION METHOD AND SYSTEM

(75) Inventor: Yang Ni, Palaiseau (FR)

(73) Assignee: Groupe des Ecoles des Telecommunications (GET) Institut National des Telecommunications (INT), Evry (FR)

( * ) Notice: Subject to any disclaimer, the term of this patent is extended or adjusted under 35 U.S.C. 154(b) by 1394 days.

(21) Appl. No.: 11/795,977

(22) PCT Filed: Jan. 23, 2006

(86) PCT No.: PCT/FR2006/050041
§ 371 (c)(1),
(2), (4) Date: Oct. 25, 2007

(87) PCT Pub. No.: WO2006/079737
PCT Pub. Date: Aug. 3, 2006

(65) Prior Publication Data
US 2009/0129441 A1    May 21, 2009

(30) Foreign Application Priority Data

Jan. 28, 2005    (FR) ..................... 05 00886

(51) Int. Cl.
*H04B 1/00*    (2006.01)
(52) U.S. Cl. ........ 375/147; 375/130; 375/149; 375/150; 375/151; 375/152; 375/343; 375/350
(58) Field of Classification Search .................. 375/147, 375/130, 149, 150, 151, 152, 343, 350
See application file for complete search history.

(56) References Cited

U.S. PATENT DOCUMENTS

| | | | | |
|---|---|---|---|---|
| 5,914,986 | A * | 6/1999 | Ohta et al. | 375/328 |
| 6,433,720 | B1 * | 8/2002 | Libove et al. | 341/144 |
| 6,763,057 | B1 | 7/2004 | Fullerton et al. | |
| 7,197,062 | B2 * | 3/2007 | England et al. | 375/130 |
| 7,313,380 | B2 * | 12/2007 | Yamaji | 455/264 |
| 7,460,622 | B2 * | 12/2008 | Baker et al. | 375/343 |
| 7,475,270 | B1 * | 1/2009 | Culler | 713/500 |
| 7,499,711 | B2 * | 3/2009 | Hoctor et al. | 455/456.1 |
| 7,532,682 | B1 * | 5/2009 | Schell | 375/302 |
| 7,636,380 | B2 * | 12/2009 | Yao et al. | 375/130 |
| 2003/0108133 | A1 * | 6/2003 | Richards | 375/351 |
| 2003/0198308 | A1 | 10/2003 | Hoctor et al. | |
| 2005/0089083 | A1 * | 4/2005 | Fisher et al. | 375/130 |
| 2005/0111524 | A1 * | 5/2005 | Baker et al. | 375/147 |

(Continued)

FOREIGN PATENT DOCUMENTS

JP    2003-169000    6/2003

(Continued)

OTHER PUBLICATIONS

Office Action for Chinese Application 2006800034641 dated Feb. 12, 2010 (English translation included).

(Continued)

*Primary Examiner* — Dhaval Patel

(57) ABSTRACT

The present invention relates to an ultra-wideband signal receiver comprising:
- at least a first set of sampling cells for sampling the waveform of a received signal;
- at least a second set of sampling cells for sampling the waveform of the received signal, with a predefined delay δ; and
- at least one correlator for delivering information depending on the correlation between the waveforms thus sampled.

42 Claims, 3 Drawing Sheets

U.S. PATENT DOCUMENTS

2006/0145853 A1* 7/2006 Richards et al. ............ 340/572.1
2007/0183535 A1* 8/2007 Maravic et al. ............... 375/316

FOREIGN PATENT DOCUMENTS

| JP | 2003-179577 | 6/2003 |
|---|---|---|
| JP | 2003-018953 | 7/2003 |

OTHER PUBLICATIONS

International Search Report and Written Opinion for PCT/FR2006/050041, mailed May 2, 2006.

Second Office Action on Chinese Application 200680003464.1, notification date Jul. 20, 2010 (with English Translation).

Witrisal et al. "Multiuser and Inter-Frame Interference in UWB Transmitted Reference Systems." Joint UWBST & IWUWBST. May 18-21, 2004, pp. 96-100.

Zhang et al. "Generalized transmitted-reference UWB systems." 2003 IEEE Conference on Ultra Wideband Systems and Technologies. Nov 16-19, 2003. pp. 147-151. Piscataway, NJ.

Romme et al. "Transmit Reference Impulse Radio Systems using Weighted Correlation." International Workshop on Ultra Wideband Systems and Technologies;. May 18-21, 2004. pp. 141-145. Kyoto, Japan.

Third Office Action on Chinese Application 200680003464.1, notification date Jan. 4, 2011 (with English Translation).

Official Notice of Rejection on Japanese Application 2007-552687, mailed Sep. 16, 2011 (with English summary).

Notice of Allowance on Japanese Patent Application 2007-552687, mailed Jun. 19, 2012 (English translation provided).

* cited by examiner

UWB RECEIVER AND A DATA TRANSMISSION METHOD AND SYSTEM

BACKGROUND OF THE INVENTION

The present invention relates to an ultra-wideband (UWB) receiver and also to a method and a system for transmitting data by implementing such a receiver.

Encoding and detection are the two key elements in all radio frequency communications systems.

In a narrow-band system, information is encoded by modulating a high frequency carrier of sinusoidal waveform, thereby facilitating radiation and propagation in empty space.

Since the modulation is very slow relative to the frequency of the carrier, the modulated signal retains its substantially sinusoidal waveform.

The multiple propagation paths that can exist between transmission and reception cause the received signal to be the result of superposing echoes of varying amplitudes and phase shifts. However the sinusoidal nature of the waveform of the transmitted signal ensures that this superposition remains substantially sinusoidal.

In this context, the signal can be detected on reception by correlation relative to a reference signal that can be generated locally within the receiver, since the waveform of the reference signal is known, being sinusoidal.

In an ultra-wideband communications system, communication can take place at a speed that is comparable to that of the frequency of the carrier used, or a non-sinusoidal impulse carrier can be used. Either way, the waveform of the modulated signal ceases to be sinusoidal in appearance.

The use of very short duration impulses as a carrier makes it possible not only to achieve very high speed transmission, but also to have an electronic embodiment that is potentially simplified since processing signals in such a system relies essentially on manipulating signals in the time domain, and such manipulations are easy to integrate monolithically in a very-large scale integration (VLSI) circuit.

In spite of these advantages, ultra-wideband systems raise difficulties in development because the short duration of a signal impulse requires it to be generated extremely rapidly and requires very fine time accuracy on detection.

Energy detection methods are not satisfactory, since an energy detector cannot distinguish between the wanted signal and noise, and presents sensitivity that is relatively low.

U.S. Pat. No. 6,763,057, the contents of which is incorporated herein by reference, describes an ultra-wideband data transmission system in which it is necessary to know the waveform of the received signal and to generate a reference signal. That system is therefore relatively complex.

In the past, the following publications: Multiuser interference and inter-France interference in UWB transmitted reference systems, 2004, Joint UWBST & IWUWBST, 2004, International Workshop on May 18-21, 2004, pp. 96-100 and Generalized transmitted reference UWB systems, Ultra-wideband Systems and Technologies, 2003, IEEE Conference on Nov. 16-19, 2003, pp. 147-151, the contents of which are incorporated herein by reference; have also made proposals to transmit ultra-wideband impulse doublets, the impulses being correlated and separated by a delay that is known accurately.

When the impulses of the doublet reach the receiver, both impulses have been subjected to the same waveform deformations and they remain correlated.

Reception includes a delay line for creating a delayed copy of the received signal, with the delay introduced by the delay line being the same as that between the impulses of the doublet. A correlator receives these two signals and generated a detected signal.

That method eliminates the difficulty of generating the reference signal, however implementing the delay line is complex. In addition, the delay is not easily programmable and the delay line presents a length that makes it practically impossible to integrate in a miniature circuit.

BRIEF SUMMARY OF THE INVENTION

The present invention seeks to propose an ultra-wideband receiver that presents good performance while being of simple construction.

Thus, in one of its aspects, the invention provides an ultra-wideband signal receiver, comprising:

- at least a first set of sampling cells for sampling the waveform of a received signal;
- at least a second set of sampling cells for sampling the waveform of the received signal, with a predefined delay $\delta$; and
- at least one correlator for delivering information depending on the correlation between the waveforms thus sampled.

Such a receiver makes it possible to omit generating the waveform of the received signal, providing the received signal comprises at least two mutually correlated impulses that are offset by the duration $\delta$.

The term "correlator" should be understood broadly and covers in general all devices capable of delivering a signal of value that depends on the resemblance between at least two waveforms.

The delay $\delta$ may be selected for example as a function of the propagation path, so that on reception the two impulses are not superposed in such a manner as could impede their reception.

By way of example, the delay $\delta$ lies in the range 10 nanoseconds (ns) to 50 ns.

In an embodiment of the invention, signal acquisition by the first and second sets of sampling cells is controlled by two distinct chains of delay elements, associated respectively with said sets of cells.

The presence of distinct chains of delay elements enable signal acquisition by the second set of sampling cells to be controlled in simple and accurate manner, e.g. by means of a quartz device.

In another embodiment of the invention, signal acquisition by the first and second sets of sampling cells is controlled by a single chain of delay elements.

By way of example, the delay is constant during a communications session.

In another embodiment of the invention, the delay may alternatively be programmable, and for example during any one communications session, it may be constant or it may vary in application of a predefined relationship.

A plurality of simultaneous transmissions are possible when each transmission system has its own delay $\delta$ allocated thereto, in a manner similar to frequency division in conventional narrow-band transmission.

The delay $\delta$ may be programmable in application of the same known relationship for an associated transmitter and receiver.

An advantage of the invention is the ease of synchronization between the transmitter and the receiver since it suffices for the impulses to lie in the sampling time window for synchronization to be established.

This sampling window preferably has a duration of several tens of nanoseconds, while the duration of the impulses is of the order of a few hundreds of picoseconds, for example. Such an order of magnitude considerably facilitates construction and contributes effectively to reducing complexity and to reducing electricity consumption.

In certain embodiments, a receiver of the invention need not have an antenna amplifier, thereby further facilitating construction and further reducing electricity consumption.

In another of its aspects, the invention also provides a method of transmitting data, the method comprising:

receiving an ultra-wideband signal comprising at least two mutually correlated impulses carrying useful information, the two impulses being offset in time by a delay $\delta$;

first sampling of the received signal;

second sampling of the received signal with the delay $\delta$; and delivering a signal that depends on the correlation between the two sampled signals.

The sampling speed is preferably greater than or equal to twice the maximum frequency contained in the impulses of the received signal. By way of example, the sampling frequency can be greater than 10 gigahertz (GHz), e.g. about 20 GHz.

When the transmitted signal comprises impulse doublets, information may be transmitted for example using on/off encoding ($O_n O_{ff} K_{ey}$) or using differential encoding. The receiver has corresponding decoding means.

In a variant implementation of the invention, the impulses transmitted within a doublet may either be in-phase or in phase-opposition, depending on the binary state that is to be transmitted, thereby complicating the electronics of the transmitter, but providing an improvement in signal-to-noise ratio.

Each set of sampling cells has 100 to 300 sampling cells, for example.

The first and second sets of sampling cells and the correlator are advantageously constructed in the form of a monolithic integrated circuit, in particular using complementary metal oxide semiconductor (CMOS) technology.

In another of its aspects, the invention also provides a data transmission system comprising:

at least one ultra-wideband receiver as defined above; and at least one transmitter arranged to transmit multiplets of at least two mutually correlated impulses, in particular doublets of mutually correlated impulses, the two impulses being offset by a predefined delay.

BRIEF DESCRIPTION OF THE DRAWINGS

The invention can be better understood on reading the following detailed description of non-limiting embodiments thereof, and on examining the accompanying drawings, in which.

DETAILED DESCRIPTION

Figure 1:
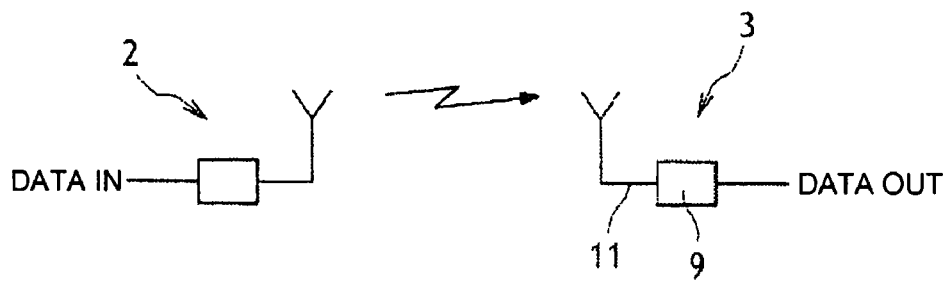
FIG. 1 is a diagram of a data transmission system made in accordance with an embodiment of the invention.

The ultra-wideband data transmission system 1 shown in FIG. 1 comprises a transmitter 2 and a receiver 3 arranged to receive the signals coming from the transmitter 2.

Figure 2:
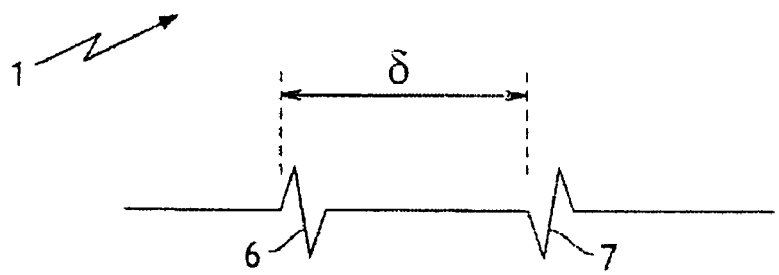
FIG. 2 is a diagram showing an impulse doublet.

In accordance with an aspect of the invention, the transmitter 2 transmits impulse multiplets, each comprising at least two impulses, and specifically impulse doublets as shown in FIG. 2, with the two impulses 6 and 7 within a doublet being separated by a delay $\delta$ that is known accurately.

Figure 3:
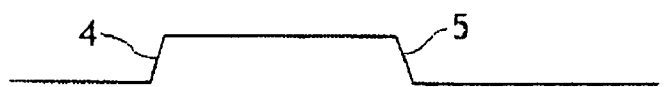
FIG. 3 is a diagram showing a signal that can be used for generating an impulse doublet.

In the example shown, the two impulses 6 and 7 are in phase opposition, e.g. being generated on the rising and falling fronts 4 and 5 respectively of a binary signal as shown in FIG. 3.

The impulses may be generated by means of a fast step recovery diode (SRD) circuit.

The antennas of the transmitter and the receiver are optionally directional wideband antennas, e.g. of the two-cone, disk-cone, or traveling wave type.

Reference can usefully be made to the work "UWB, Theory and Applications", editors Ian Oppermann, Matti Hämäläinen, Jari, Linatti, John Wiley and Sons, Ltd., 2004 ISBN 0-470-86917-8, the contents of which is incorporated herein by reference.

The information transmitted by the transmitter may be encoded in various ways, for example using on/off encoding or differential encoding.

Figure 4:
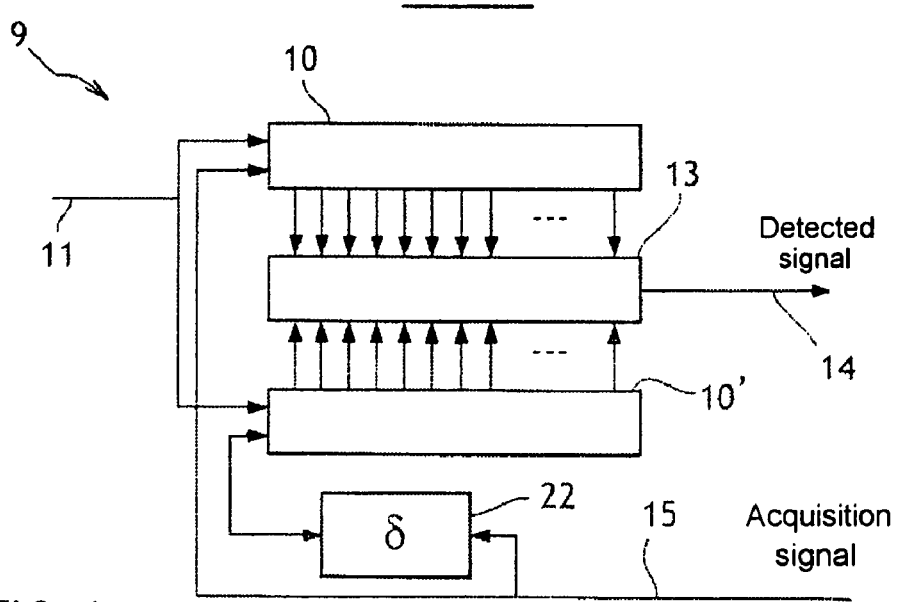
FIG. 4 is a fragmentary block diagram showing a detail of an embodiment of a receiver in accordance with the invention.

The receiver 3 comprises a receiver circuit 9 that is shown in greater detail in FIG. 4.

Figure 5:
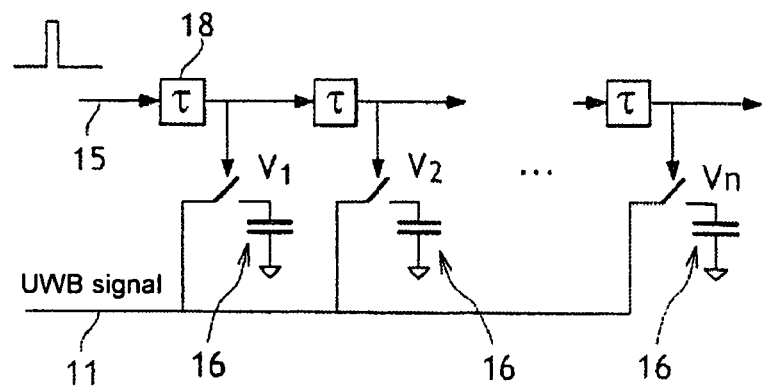
FIG. 5 is a diagram showing a set of sampling cells.

The receiver circuit 9 comprises a first set 10 of sampling cells 16 arranged as shown in FIG. 5, and a second set 10' of sampling cells 16, e.g. arranged identically to the first set, the two sets receiving in parallel the signal 11 coming from the antenna.

The receiver circuit 9 further comprises a parallel cell correlator 13 delivering a detected signal 14 depending on the correlation between the waveforms sampled by the first and second sets of sampling cells, as described in greater detail below.

A sampler capable of sampling a fast waveform is described in the publication "Gigahertz waveform sampling and digitization circuit design and implementation", the contents of which is incorporated herein by reference.

The sampling is performed on the basis of an acquisition signal 15, this signal 15 being delayed by the duration $\delta$ by a delay element 22 before reaching the second set 10'.

By way of example, the acquisition signal 15 is generated by a quartz device, and each sampling cycle can take place after the correlator 13 has delivered information associated with possible correlation between the sampled waveforms.

By way of example, the delay element 22 is programmable, thereby enabling communications channels to be created.

During a communications session, the delay $\delta$ can be constant, or it can be variable if the delay $\delta$ varies at the transmitter in application of a predefined relationship that is known to the receiver.

The sampling cells 16 are controlled in each set 10 or 10' in the example of FIG. 4 by means of a chain of delay elements 18 that introduces consecutive delays $\tau$, such that the acquisition signal 15 injected into the chain of delay elements 18 propagates and triggers sampling in succession by the cells 16.

Each set 10 and 10' thus serves to record voltages $V_1$, $V_2, \ldots, V_n$ and $V'_1, V'_2, \ldots, V'_n$ corresponding to the waveform of the sampled signal for the duration of the propagation of the acquisition signal along the chain of delay elements 18.

Figure 6:
FIG. 6 shows an example of a received signal.

FIG. 6 shows an example of a signal received after the doublet of FIG. 2 has been transmitted.

FIG. 6 shows how the signal is deformed as a result of propagation.

Figure 7:
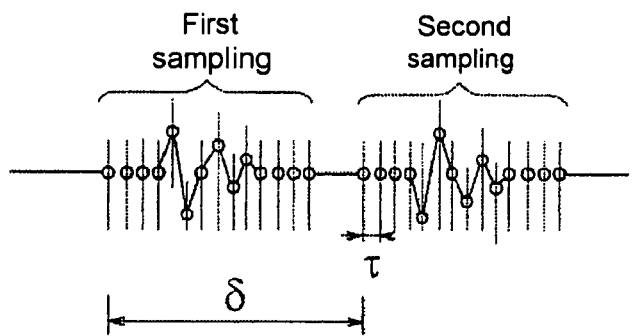
FIG. 7 shows an example of a sampled signal.

FIG. 7 shows the signals sampled in the first and second sets 10 and 10' of sampling cells.

Figure 8:
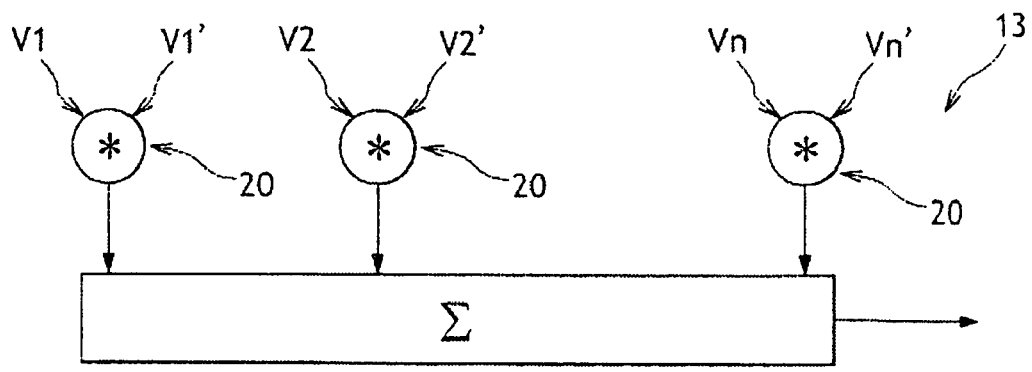
FIG. 8 is a diagram showing the structure of a parallel cell correlator.

By way of example, the correlator 13 is a parallel cell correlator, shown diagrammatically in FIG. 8, having a plurality of cells 20 that can produce the product of multiplying together the voltages $V_1*V'_1, V_2*V'_2, \ldots, V_n*V'_n$, and calculating the sum of these products.

The voltages are multiplied by means of Gilbert cells, for example.

Figure 9:
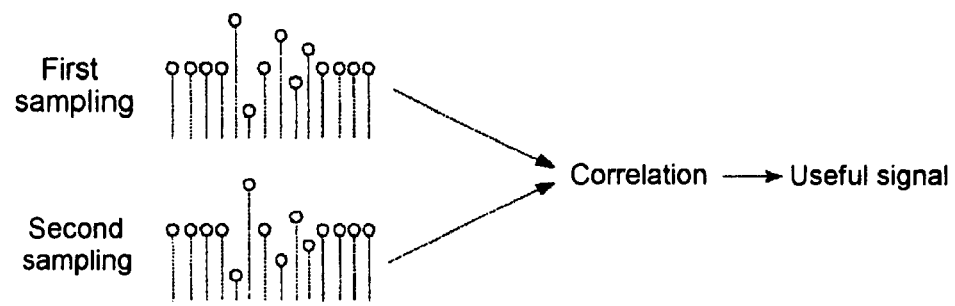
FIG. 9 shows the juxtaposition of waveforms recorded in two sets of sampling cells.

FIG. 9 shows in juxtaposed manner the two waveforms sampled in the first and second sets of sampling cells. The detected signal 14 depends on their resemblance.

Naturally, the invention is not limited to the embodiments described above.

Figure 10:
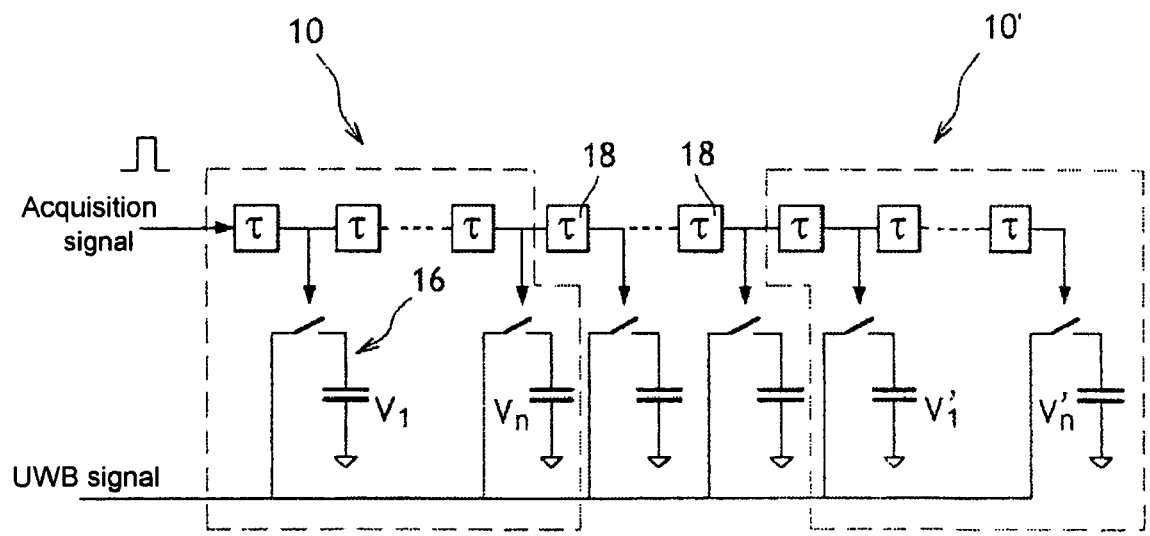
FIG. 10 shows a variant arrangement of sampling cells.

For example, the sets 10 and 10' of sampling cells 16 can be controlled by a single chain of delay elements, as shown in FIG. 10.

A certain number of delay elements 18 between the first and second sets 10 and 10' serve to generate the delay δ and to control sampling by the second set 10' with said delay δ.

A data transmission system of the invention can find numerous applications, e.g. for transmitting digital data over short distances, e.g. as a replacement for Bluetooth® technology, for causing sensors to communicate in a network, or for fitting to telephones or other portable appliances.

Where appropriate, the receiver may have three or more sets of sampling cells, when the received signal comprises impulse triplets or other multiplets.

The processing of the voltages corresponding to the waveforms sampled in the correlator can be performed other than by using Gilbert cells, for example by evaluating the magnitudes:

$$\sum_i |V_i - V'_1|^2 \text{ or } \sum_i |V_i - V'_1|$$

Where appropriate, the sampling cells may be cells that are more complex, e.g. being capable of storing information in digital form rather than in analog form.

The connection between the receiver and the transmitter may be by wire.

Throughout the description, including in the claims, the term "comprising a" should be understood as being synonymous with "comprising at least one" unless specified to the contrary.

The invention claimed is:

1. An ultra-wideband signal receiver comprising:
a first set of sampling cells comprising a first plurality of sampling elements configured to sample a waveform of a received signal;
a second set of sampling cells comprising a second plurality of sampling elements configured to sample a delayed waveform of the received signal; and
a correlator operatively coupled to the first set of sampling cells and to the second set of sampling cells, wherein the correlator is configured to generate an output signal based at least in part on a correlation between the waveform and the delayed waveform.

2. The receiver of claim 1, further comprising:
a first chain of delay elements associated with the first set of sampling cells and configured to control sampling by the first set of sampling cells; and
a second chain of delay elements associated with the second set of sampling cells and configured to control sampling by the second set of sampling cells.

3. The receiver of claim 2, wherein the first chain of delay elements is configured to receive an acquisition signal to control a timing of the sampling by the first set of sampling cells.

4. The receiver of claim 3, further comprising a quartz device configured to generate the acquisition signal.

5. The receiver of claim 3, wherein the second chain of delay includes a first delay element configured to delay the acquisition signal by δ such that the delayed waveform is delayed by δ relative to the waveform.

6. The receiver of claim 1, further comprising a single chain of delay elements configured to control sampling of the first set of sampling cells and the second set of sampling cells.

7. The receiver of claim 1, wherein the correlator comprises a parallel cell correlator.

8. The receiver of claim 1, wherein the first set of sampling cells, the second set of sampling cells, and the correlator are part of a monolithic integrated circuit.

9. The receiver of claim 1, wherein the received signal comprises a plurality of impulse multiplets.

10. The receiver of claim 9, wherein impulses of at least one of the impulse multiplets are in phase opposition.

11. The receiver of claim 9, wherein impulses of at least one of the impulse multiplets are in phase.

12. The receiver of claim 9, wherein impulses of at least one of the impulse multiplets occur within a sampling time window for synchronization to be established between the ultra-wideband signal receiver and a transmitting device.

13. The receiver of claim 9, wherein the waveform is sampled at a sampling speed that is greater than or equal to twice a maximum frequency contained in the impulse multiplets.

14. The receiver of claim 1, wherein sampling of the delayed waveform is delayed by a time δ relative to sampling of the waveform.

15. The receiver of claim 14, wherein the time δ is based at least in part on a propagation path of the received signal.

16. The receiver of claim 14, wherein the time δ is between ten nanoseconds and fifty nanoseconds.

17. The receiver of claim 14, wherein the time δ is constant during a communication session between the ultra-wideband signal receiver and a transmitter.

18. The receiver of claim 14, wherein the time δ is programmable such that the time δ varies during a communication session between the ultra-wideband signal receiver and a transmitter.

19. The receiver of claim 18, wherein the time δ varies based at least in part on a predefined relationship between the ultra-wideband signal receiver and the transmitter.

20. The receiver of claim 14, wherein the received signal comprises a plurality of impulse doublets, and further wherein a pair of the impulse doublets are offset in time by the time δ.

21. The receiver of claim 1, wherein the received signal includes information that is encoded onto the received signal using at least one of on/off encoding or differential encoding.

22. The receiver of claim 1, wherein the first set of sampling cells samples the waveform by determining a first plurality of voltages corresponding to the waveform, and wherein the second set of sampling cells samples the delayed waveform by determining a second plurality of voltages corresponding to the delayed waveform.

23. The receiver of claim 22, wherein the correlator is configured to:
multiply a first waveform voltage from the first plurality of voltages by a first delayed waveform voltage from the second plurality of voltages to obtain a first product;
multiply a second waveform voltage from the first plurality of voltages by a second delayed waveform voltage from the second plurality of voltages to obtain a second product; and
add the first product and the second product to obtain a sum, wherein the output signal is based at least in part on the sum.

24. The receiver of claim 23, wherein the first waveform voltage is multiplied by the first delayed waveform voltage using a Gilbert cell.

25. A method comprising:
sampling a waveform of a received signal with a first set of sampling cells comprising a first plurality of sampling elements of a receiving device;
sampling a delayed waveform of the received signal with a second set of sampling cells comprising a second plurality of sampling elements of the receiving device, wherein the delayed waveform is delayed by a predefined δ; and
generating an output signal based at least in part on a correlation between the waveform and the delayed waveform.

26. The method of claim 25, wherein the received signal comprises at least two mutually correlated impulses.

27. The method of claim 26, wherein the two mutually correlated impulses are offset in time by the predefined δ.

28. The method of claim 25, wherein the received signal is generated by a fast step recovery diode circuit at a transmitter in communication with the receiving device.

29. The method of claim 25, further comprising receiving the received signal from a transmitter in communication with the receiving device.

30. The method of claim 25, wherein the first set of sampling cells comprises between 100 and 300 individual sampling cells.

31. The method of claim 25, further comprising receiving an acquisition signal at the first set of sampling cells, wherein the acquisition signal controls the sampling of the waveform.

32. The method of claim 31, further comprising receiving the acquisition signal at the second set of sampling cells the predefined δ after the acquisition signal is received at the first set of sampling cells.

33. The method of claim 25, wherein the received signal is received by the first set of sampling cells and by the second set of sampling cells in parallel.

34. The method of claim 25, wherein the received signal is received by the second set of sampling cells after the received signal is received by the first set of sampling cells.

35. A system comprising:
a transmitting device comprising:
a circuit configured to generate a signal; and
a transmitter configured to transmit the signal to a receiving device; and the receiving device comprising:
a first set of sampling cells comprising a first plurality of sampling elements configured to sample a waveform of the signal;
a second set of sampling cells comprising a first plurality of sampling elements configured to sample a delayed waveform of the signal; and
a correlator operatively coupled to the first set of sampling cells and to the second set of sampling cells, wherein the correlator is configured to generate an output signal based at least in part on a correlation between the waveform and the delayed waveform.

36. The system of claim 35, wherein the circuit comprises a fast step recovery diode circuit.

37. The system of claim 35, wherein the receiving device further comprises a first chain of delay elements associated with the first set of sampling cells and configured to receive an acquisition signal to control sampling of the waveform by the first set of sampling cells.

38. The system of claim 35, wherein sampling of the delayed waveform is delayed by a time δ relative to sampling of the waveform, wherein the received signal comprises a plurality of impulse doublets, and further wherein a pair of the impulse doublets are offset in time by the time δ.

39. The system of claim 35, wherein the first set of sampling cells samples the waveform by determining a first plurality of voltages corresponding to the waveform, and wherein the second set of sampling cells samples the delayed waveform by determining a second plurality of voltages corresponding to the delayed waveform.

40. An ultra-wideband signal receiver comprising:
a first set of sampling cells comprising a first plurality of sampling elements configured to sample a waveform of a received signal when an acquisition signal is received;
a second set of sampling cells comprising a second plurality of sampling elements configured to sample the waveform of the received signal when a delayed acquisition signal is received;
a correlator operatively coupled to the first set of sampling cells and to the second set of sampling cells, wherein the correlator is configured to generate an output signal based at least in part on a correlation between a first output of the first set of sampling cells and a second output of the second set of sampling cells.

41. A method comprising:
sampling a waveform of a received signal when an acquisition signal is received with a first set of sampling cells comprising a first plurality of sampling elements of a receiving device;
sampling the waveform of the received signal when a delayed acquisition signal is received with a second set of sampling cells comprising a second plurality of sampling elements of the receiving device; and
generating an output signal based at least in part on a correlation between a first output of the first set of sampling cells and a second output of the second set of sampling cells.

42. A system comprising:
a transmitting device comprising:
a circuit configured to generate a signal; and
a transmitter configured to transmit the signal to a receiving device; and the receiving device comprising:

a first set of sampling cells comprising a first plurality of sampling elements configured to sample a waveform of the signal when an acquisition signal is received;

a second set of sampling cells comprising a first plurality of sampling elements configured to sample the waveform of the signal when a delayed acquisition signal is received; and a correlator operatively coupled to the first set of sampling cells and to the second set of sampling cells, wherein the correlator is configured to generate an output signal based at least in part on a correlation between a first output of the first set of sampling cells and a second output of the second set of sampling cells.

* * * * *

UNITED STATES PATENT AND TRADEMARK OFFICE
CERTIFICATE OF CORRECTION

| | | |
|---|---|---|
| PATENT NO. | : 8,355,425 B2 | Page 1 of 1 |
| APPLICATION NO. | : 11/795977 | |
| DATED | : January 15, 2013 | |
| INVENTOR(S) | : Ni | |

It is certified that error appears in the above-identified patent and that said Letters Patent is hereby corrected as shown below:

On the Title Page, "Primary Examiner", in Column 2, Line 1, delete "Dhavel Patel" and insert -- Dhaval Patel --, therefor.

In the Specification

In Column 2, Line 27, delete "6." and insert -- $\delta$ --, therefor.

Signed and Sealed this
First Day of April, 2014

Michelle K. Lee
*Deputy Director of the United States Patent and Trademark Office*